United States Patent [19]
Albrecht

[11] Patent Number: 5,442,891
[45] Date of Patent: Aug. 22, 1995

[54] ROOT-CONTROL BARRIER COMBINATION, AND METHOD OF CONTROLLING ROOTS BY BARRIERS HAVING EITHER SINGLE-ELONGATE OR CLOSED-LOOP CONFIGURATIONS

[75] Inventor: Leonard N. Albrecht, Irvine, Calif.

[73] Assignee: Deep Root Partners, L.P., Burlingame, Calif.

[21] Appl. No.: 682,581

[22] Filed: Apr. 8, 1991

[51] Int. Cl.6 .............................. E04B 1/344
[52] U.S. Cl. .................. 52/745.14; 52/741.3; 52/578; 52/102; 52/71; 52/741.11; 47/25
[58] Field of Search ............ 47/25, 32, 84, 23, 33; 52/102, 71, 582, 578, 741.3, 742, 745.05, 745.13, 745.14

[56] References Cited
U.S. PATENT DOCUMENTS

| | | | |
|---|---|---|---|
| 82,234 | 9/1868 | Letherbury | 47/23 |
| 682,031 | 9/1901 | Chisolm | 47/23 |
| 933,654 | 9/1909 | Lippincott | 47/23 |
| 2,085,436 | 6/1937 | Maurer | 52/71 |
| 3,460,860 | 8/1969 | Stevens, Jr. | 52/71 |
| 4,019,279 | 4/1977 | Moorman et al. | 47/25 |
| 4,665,645 | 5/1987 | Schau, III et al. | 47/25 |
| 4,995,191 | 2/1991 | Davis | 47/25 |
| 5,070,642 | 12/1991 | Albrect | 47/25 |

OTHER PUBLICATIONS

Deep Root Corporation; Oct., 1988 catalog; pp. 8, 9, 13 and 15.

Primary Examiner—Carl D. Friedman
Assistant Examiner—Robert Canfield
Attorney, Agent, or Firm—Richard L. Gausewitz

[57] ABSTRACT

A root-control barrier apparatus and method employing living hinges, such hinges forming parts of various types of root-control barriers including single-elongate, closed-loop polygonal with different numbers of sides, and curved.

7 Claims, 3 Drawing Sheets

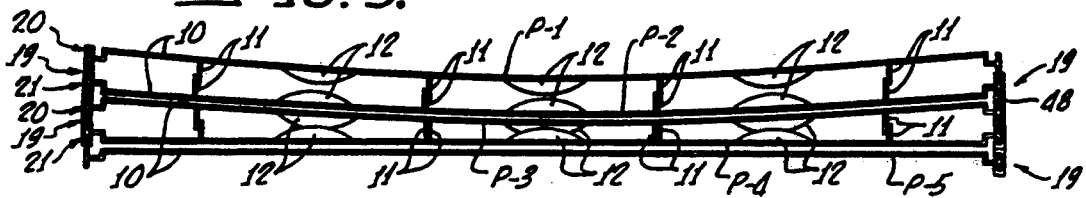
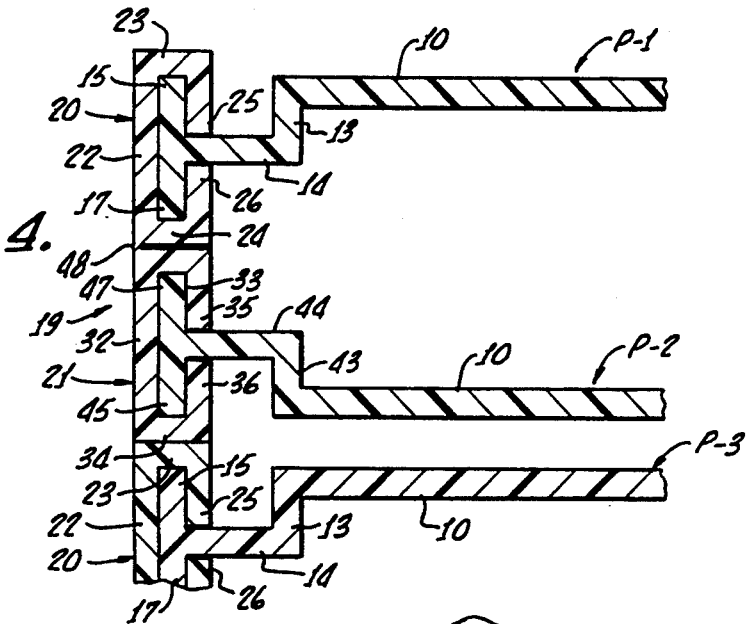
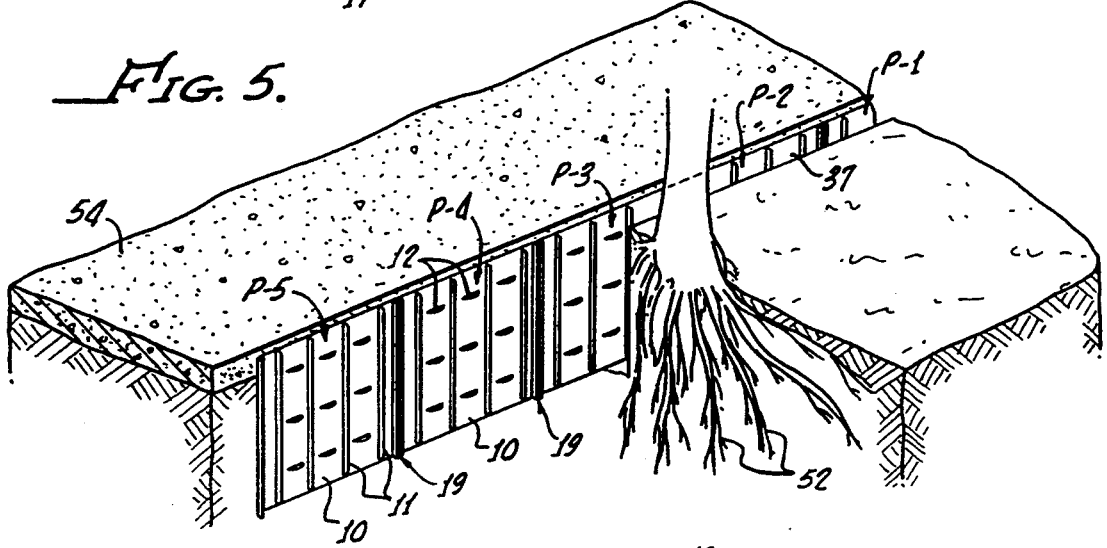
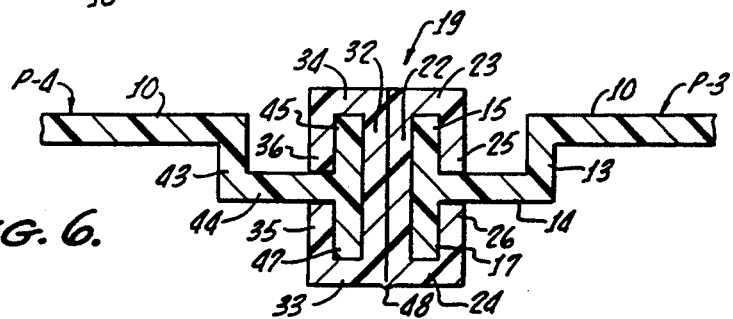

ROOT-CONTROL BARRIER COMBINATION, AND METHOD OF CONTROLLING ROOTS BY BARRIERS HAVING EITHER SINGLE-ELONGATE OR CLOSED-LOOP CONFIGURATIONS

BACKGROUND OF THE INVENTION

Root-control barriers have become widely used in the prevention of damage by tree roots to sidewalks and other static structures. There are, however, practical problems and expenses associated with use of those control barriers marketed prior to the present invention. Notably, these problems relate to (a) shipment, storage and inventory management of the control barriers, and (b) labor and difficulty at the job site.

Relative to the problems designated under (a) above, the pioneer and still widely-used control barrier is a hollow frustum of a pyramid, having internal vertical ridges. These are shipped and stored in nested condition. During shipment and storage, the ridges of one control barrier cannot be interleaved, at all, with those of another control barrier. At the job site, the control barriers are always a closed-loop configuration of predetermined size; they cannot be used in single-elongate configuration along a sidewalk, for example.

Another type of control barrier is shipped and stored in large rolls, being wound up in the manner of clock springs. The ridges of such volutes cannot be interleaved at all. Furthermore, the circular configuration means that there is inherently space wasted between adjacent rolls in that adjacent rolls can only touch each other along lines instead of surfaces.

Another type of control barrier employs individual panels adapted to be connected together by extruded connectors, and having ridges on one side thereof. These can be shipped and stored in stacked relationship and with their ridges interleaved to increase packing density. However, the individual unconnected panels, and associated extrusions, are not adapted for closed-loop configurations in shapes other than circular or curved. Furthermore, they are subject to problems indicated above under (b), in that they all must be connected together at the job site.

For years, the best and widely used manner of connecting the panels together has been by the extruded connectors; these slide laterally along flange portions at the ends of endwise-related panels. Making these connections, even though no adhesive is required, has required a substantial amount of work at the job site. Furthermore, the connectors are not such as to permit making of corners at the regions where the ends (end edges) of panels come into proximity with each other. Instead, the connectors only permit the ends to be in line with each other, so that if a closed-loop configuration is desired it is—with these elements—necessarily a substantial circle and not a square, polygon, etc.

Relative to the above-indicated continuous barrier wound in a roll or volute, this generates particular difficulties at the job site. For example, it is difficult to install such a barrier in a narrow trench that has been made by a root-pruning machine. Such trenches are often only a few inches wide. To unroll a substantial length of previously-rolled barrier, and which has a memory tending to make it remain in rolled condition, and install such barrier in a narrow trench, can be a difficult job.

Another major factor, relative to barriers in roll or volute form, relates to wastefulness. For example, if it is desired that the barrier be twelve feet long, and the roll is eighteen feet long, there is a six-foot strip left over after the barrier has been cut. This six-foot strip must usually either be discarded or connected to other "waste" or full strips by a gluing operation.

An additional problem at the job site relates to obtaining the desired length of single-elongate barrier even when unskilled labor is employed. It would be highly desirable to know that a certain number of pre-connected sections or panels create a barrier of predetermined length along a sidewalk, for example.

Relative to inventory management, it would be especially desirable to have a single type of construction that could be used either in single-elongate configuration as, for example, along a sidewalk, or in closed-loop configuration of square or other polygonal cross section. This single type could be shipped and stored by wholesalers, contractors, etc., and then the decision could be made as to how much of the single type of construction is to be single-elongate and how much is to be closed-loop square or other polygonal (or curved) shape.

SUMMARY OF THE INVENTION

The present apparatus relates to the combination of a root-control barrier with a tree and a static structure (for example: sidewalk, road pavement, curb, decking, slab, foundation, swimming pool, etc.), or with a tree and an area (for example, a garden) where high-level tree roots are not desired. The word "tree" denotes trees having roots capable of growing sufficiently large to damage such static structure. The method of the invention relates to employing a certain root-control barrier to prevent the roots of a tree from damaging a static structure.

The root-control barrier employed in the apparatus or method comprises an elongate combination of root-control panels, the panels being connected to adjacent panels by articulated joints. In the preferred embodiment, the articulated joints are such that the panels can be bent into closely-packed zigzag or accordion-folded relationship. In the preferred embodiment, there are articulated joints between adjacent panels, such joints being capable of being separated from the panels as by being pulled transversely of the panels.

In accordance with one aspect of the method and apparatus, the panels connected by articulated joints are formed into a closed loop around a tree. Such closed-loop is a polygon having three, four, five or more sides. In accordance with another aspect of the invention, the articulated joint-connected panels are not arranged in a closed loop but instead in single-elongate configuration along a static structure or area to be protected, or anywhere between such static structure (or area) and the tree having the roots being guarded against. In accordance with another aspect of the invention, the articulated joints are continuous so as to prevent penetration of tree roots therethrough.

In accordance with another aspect of the invention, flexible "living" synthetic resin joints are employed having a substantially 180-degree range of movement, and these are mounted at the factory so that the panels are in relatively closely-packed zigzag or accordion-fold relationship. Then, at the job site, if the barrier is to be single-elongate the installer merely counts a number of panels corresponding to the desired length barrier, and then removes a joint so as to disconnect the barrier length from the remainder of the accordion-stack. The connected sections thus separated are pulled to substantially straight or curved configuration and dropped into a previously-formed trench such as (for example) that made by a root pruner.

If, on the other hand, a closed-loop polygonal configuration is desired then alternate ones of the living joints are reversed from the condition they had when leaving the factory. The panels are bent into the desired polygon, and the ends are connected to form the closed loop.

In the preferred embodiment, the panels have ridges on only one side thereof, and these at least partially interleave with each other when the panels are bent into closely-packed zigzag configuration at the factory. Accordingly, the percentage of "air" that is shipped or stored is low.

BRIEF DESCRIPTION OF THE DRAWINGS

FIG. 3 is a top plan view showing four joint-connected panels in accordion-folded or zigzag relationship;

FIG. 4 is an enlarged horizontal fragmentary sectional view at the left end of FIG. 3;

FIG. 5 is a fragmentary isometric view of a combination comprising a single-elongate barrier, tree and sidewalk, with portions of the earth removed so as to show a barrier in a trench;

FIG. 6 is an enlarged horizontal sectional view of one of the barrier joints in the barrier of FIG. 5;

DETAILED DESCRIPTION OF THE PREFERRED EMBODIMENT

For background information and some disclosure, reference is made to U.S. Pat. No. 4,019,279, issued Apr. 26, 1977. Said patent is hereby incorporated by reference herein.

In the present specification and claims, the words "inner surface" "inner side" etc of a panel or barrier denote that side closest to the tree whose roots are being guarded against Conversely, the "outer surface" etc., of the panel (or barrier) is that side farthest from such tree.

In the best mode, each panel is identical to each other panel.

Figure 1:
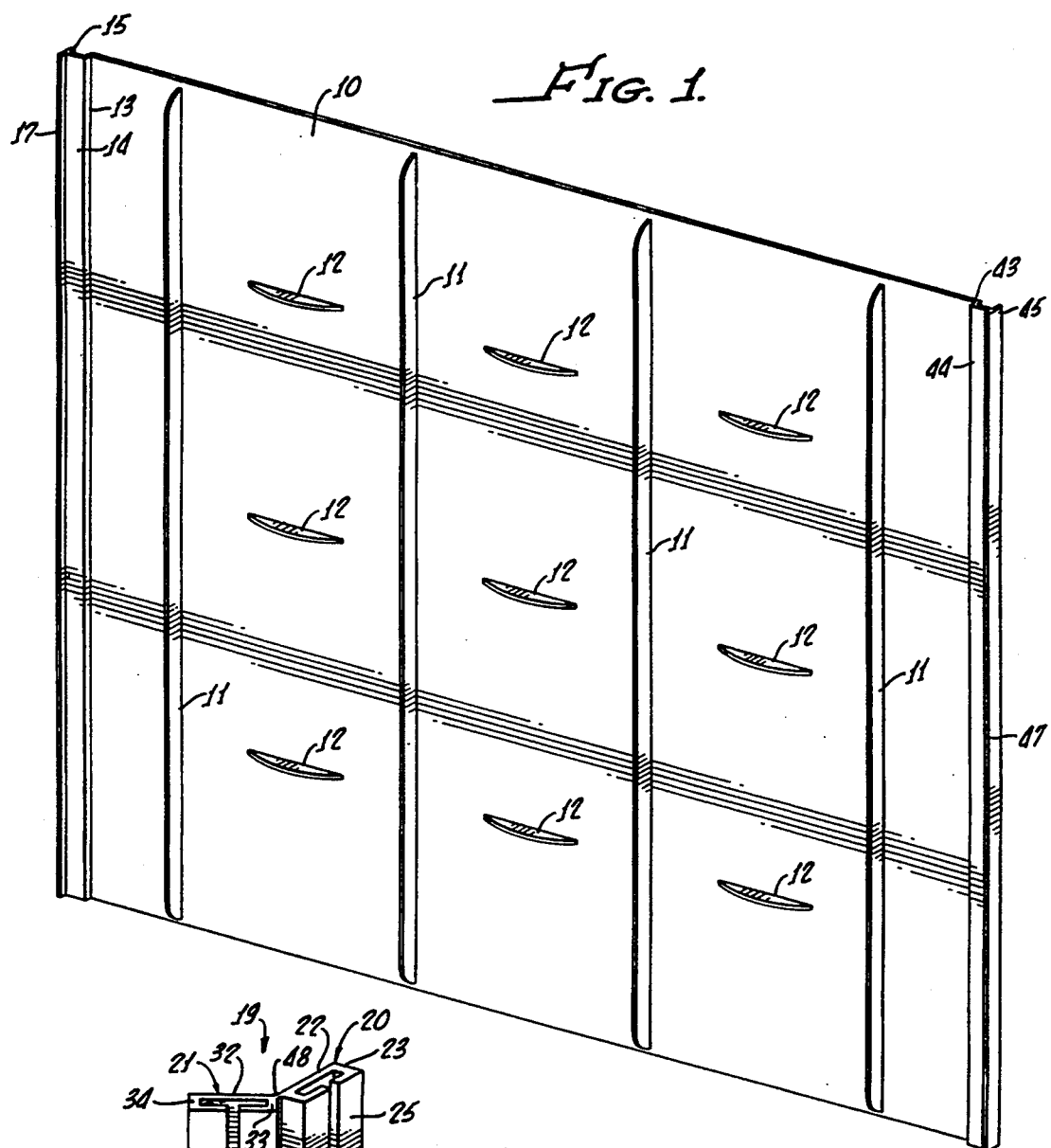
FIG. 1 is an isometric view of one of the panels, with no joint elements.

As shown in FIG. 1, each root-control barrier panel P is rectangular and preferably horizontally elongate. Each panel P is formed of such a material, and has a thickness such that, it may not be penetrated by tree roots. In the best mode, each panel is a sheet 10 of synthetic resin having a thickness of about 0.080 inch. The outer side of the sheet is preferably devoid of protuberances, while the inner side of each panel has a plurality of spaced vertical ridges 11. In the best mode, the ridges 11 are spaced about six inches apart, and are 0.060 inch thick, and extend perpendicularly to the inner surface of the panel for about one-half inch. The corner between the parallel faces or sides of each ridge 11, and the inner face of the panel is abrupt, preferably ninety degrees. The inner surface of the panel is smooth In the best mode, there are horizontal ledges 12 disposed between ridges 11 and spaced vertically relative to each other. Such ledges are ground locks adapted to be engaged by tree roots, on the upper surfaces of the ledges, so that the tree roots prevent such ledges and thus the panel from moving upwardly in the earth.

In the best mode, each panel has a height of about twelve inches or about eighteen inches. In the best mode, each panel is injection molded.

Referring to FIGS. 1 and 4, one end (the left end in FIG. 1) of each panel P is formed with a groove on the inner side thereof. Each such groove has sidewall 13 extending perpendicularly to the sheet 10. The groove also has a bottom wall 14 extending parallel to the sheet 10, and has a second sidewall 15 that is spaced from and parallel to sidewall 13. Extending inwardly from the bottom wall 14 in coplanar relationship to sidewall 15 is a flange 17. Preferably, sidewall 15 and flange 17 extend equal distances on opposite sides of wall 14.

Figure 2:
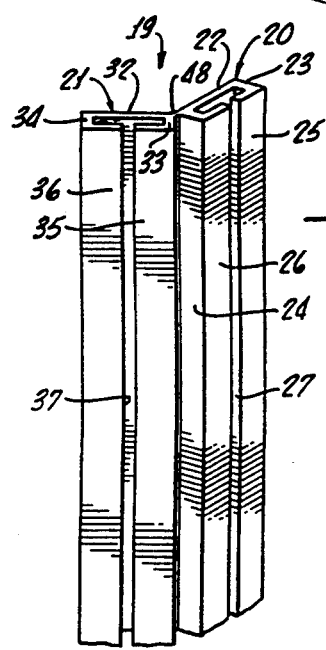
FIG. 2 is an isometric view of one of the joint elements.

A plurality of identical ( in the best mode) articulated joints, or "living hinges" 19 are provided as shown in FIGS. 2-4. Each is illustrated to comprise two identical channels 20 and 21. Channel 20 has a flat web 22 and flanges 23,24 extending perpendicularly to the edges of such web 22. Locking flanges 25 and 26, respectively, are provided integrally at the outer edges of flanges 23 and 24, in parallel relationship to web 22, and with a gap 27 therebetween for reception of the above-described wall 14. Also, as shown in FIG. 4, the sidewall 15 and flange 17 fit, respectively, between flanges 25,26 and web 22.

The second of the identical channels, number 21, in each living hinge 19 has a web 32 corresponding to web 22, flanges 33 and 34 respectively corresponding to flanges 23 and 24, locking flanges 35 and 36 respectively corresponding to flanges 25 and 26, and a gap 37 corresponding to gap 27. As shown in FIG. 4, such second channel 21 of the living hinge 19 holds the other end of a second panel. For convenience, the first-mentioned panel is denoted P-1, while the last-mentioned panel is denoted P-2.

Such other end of each panel P (the right end in FIG. 1) has, as shown in FIGS. 1 and 4, a groove sidewall 43 that is the mirror image of sidewall 13 at the one (left) end (FIG. 1) of each panel P. Such other end also has a bottom wall 44 corresponding to the bottom wall 14 of the above-indicated one end. It further has a sidewall 45 that corresponds to (being the mirror image of) sidewall 15 of the one end, and a flange 47 that corresponds to flange 17 of the indicated one end, being the mirror image thereof. As is the case relative to the one end (elements 13–15 and 17), the other end (elements 43–45 and 47) is in the nature of a groove and associated flange 45, being on the inner side of the panel.

The living hinge 19 is made of a relatively soft and flexible synthetic resin. At a thin connector region 48, the exterior corner where web 22 meets flange 24 is integrally connected to the exterior corner where web 32 meets flange 33. The thin connector region 48 runs continuously for the full length of each channel 20,21, which channels are coextensive, so as to prevent penetration of hair-like immature or incipient roots.

The thin connector region 48 is so flexible that the channels 20,21 may move through approximately 180 degrees relative to each other, between the position at which the webs 22,32 are in flatwise engagement with each other (FIG. 6) to a position at which flanges 24,33 are in flatwise engagement with or closely adjacent each other and webs 22,32 are coplanar (FIG. 4).

The materials and tolerances and fits are selected so that the hinge 19 may be manually slid over the elements 14,15,17 and 44,45,47, without use of large force. On the other hand, the fits, etc., are caused to be such that the hinge 19 is preferably not so loose on these elements that it will tend to unintentionally slide off while installation or other operations are proceeding at the job site.

Shipment, Storage and Inventory Management

Referring to FIGS. 3 and 4, "bundles" of panels P are shown in closely-packed accordion-folded relationship with the various articulated joints 19 already in mounted condition. It is pointed out (FIG. 3) that the ridges 11 on the inner sides of adjacent panels P-1, P-2, etc., are in partially interleaved relationship. On the other hand, the outer sides of sheets 10 of panels P are in substantially flatwise engagement with each other. The "bundles" of panels P may be of any length (thickness), and may be tied together or packed in correspondingly-sized cardboard cartons for shipment.

As shown in FIG. 4, when the panels P are in accordion-folded closely-nested relationship for shipment or storage, the outer surfaces of the webs 22 and 32 of each articulated joint or living hinge 19 are in substantially coplanar relationship relative to each other. The thin connector regions 48 are on the extreme far left sides of the hinges 19 shown in FIG. 4, in substantially the same planes as the exterior surfaces of webs 22,32 (FIG. 4). The same relationship applies relative to the joint, and other unshown joints, at the extreme right portion of FIG. 3. These latter joints are—except for some offsetting—the mirror images of what is shown in FIG. 4, so that the thin connector regions 48 are at the far right sides of the hinges (FIG. 3).

When the bundles of panels are shipped and stored, they are in such relationship to each other that expanding of the accordion-related elements into single-elongate generally linear condition will result in a root-control barrier where all of the ridges 11 and ground locks 12 are on the same (inner) side, and all of the flat surfaces of sheets 10 are on the other same (outer) side.

Relative to the inventory-management aspects of the invention, it is pointed out that any number of "bundles" of panels P may be stored at any warehouse, store or job site. Then, various panels P and joints 19 are used for either single-elongate control barriers—whether straight or curved—or closed-loop barriers that are very preferably polygonal but may if desired be made curved or circular.

Apparatus and Method Relative to Combinations Including Single-Elongate Root-Control Panels The method and apparatus described under the present subhead, and elsewhere in this application, may be employed relative to either newly-planted or transplanted trees, or mature trees the roots of which have been root pruned. Without limitation, the following description under this subheading is given relative to a mature tree that has been root pruned.

A relatively mature tree 51 (FIG. 5) has roots 52 that have been root pruned on one side, for example at the illustrated narrow trench 53 formed adjacent a concrete sidewalk 54 or other static structure. It is to be understood that the trench 53 is conventionally made by use of a rotary root-pruning apparatus which cuts gaps in the roots 52 while simultaneously forming the trench 53.

For purposes of illustration, let it be assumed that a root-control barrier ten feet long is desired in the trench 53 between tree 51 and sidewalk 54. Let it also be assumed that each panel P is two feet long, the preferred length.

Accordingly, the worker at the job site counts five panels P in a bundle of such panels, and then slides the articulated joint member 19 at the end of the fifth panel, in a lateral direction so as to break the joint between the fifth panel and the adjacent (sixth) panel.

The operator then lifts the five panels away from the bundle while still keeping all five such panels connected to each other by the articulated joints 19. The operator then straightens out the accordion-related panels P into a substantially straight line, while progressively introducing the lower edges of such panels P into the trench 53, with the ridges 11 and ledges 12 on the side of the sheets 10 facing the tree 51 (the inner side).

The root pruning or trenching operation is so performed that, at least at the time when the root-control barrier is introduced into the trench, the bottom surface of the trench is at a distance from the surface of the ground substantially corresponding to the vertical dimension of the panels. Thus, the upper edges of the panels P are at substantially grade level. The insertion of the panels into the trench is so conducted, typically, that the center of the single-elongate series of five panels is substantially directly opposite the center of the tree 51.

It is then merely necessary to backfill earth into the trench 53, to substantially permanently retain the panels P in the ground at the desired elevation.

Accordingly, a row of (for example) the five panels P-1, P-2, P-3, P-4 and P-5 shown in FIG. 3 is placed in trench 53 (FIG. 5), portions of the trench being unshown because the earth is broken away. The resulting single-elongate control barrier is disposed between tree 51 and sidewalk 54 to protect the latter from additional root growth from the tree 51.

Figure 6A:
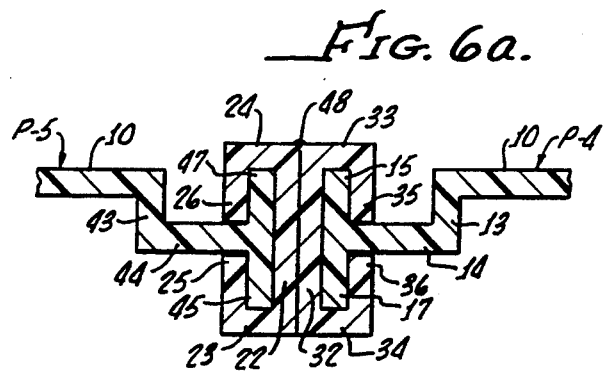
FIG. 6a (sheet 1 of drawings) corresponds to FIG. 6 but shows a joint adjacent to that of FIG. 6.

Panels P-1 and P-2 cannot be fully seen in FIG. 5, because they are in the right portion of trench 53 from which earth is not broken away (in the drawing). The joint between P-3 and P-4 is shown in FIG. 6. That between P-4 and P-5 is shown in FIG. 6a (first sheet of drawings).

It is emphasized that the joint of FIG. 6 has element 48 on the inner side; the joint of FIG. 6a has element 48 on the outer side. In alternate joints, in a single-elongate control panel resulting from unfolding of accordion related sections, the element 48 is on the inner side, outer side, inner side, etc.

When an additional root grows outwardly from the tree and engage sheet 10 of one of the panels, it cannot penetrate such sheet and therefore typically turns sideways and grows substantially horizontally along the sheet. This growth continues until one of the ridges 11 is engaged. The new hair-like end of the root then does not "want" to grow back toward the tree 10 nor does it normally want to grow upwardly, which means that the root grows downwardly until it reaches the bottom of the sheet 10. Thereafter, the root typically grows horizontally away from the tree but at a sufficient distance beneath the bottom of sidewalk 54 that expansion of the root as it matures will not crack or otherwise damage the sidewalk.

It is emphasized that no assembly operation, or measuring operation, is required at the job site. The operation of installing the single-elongate root-control barrier is very quick and easy. This is true even if the trench 53 is narrow, for example three inches.

It is to be understood that the sidewalk or other static structure may be curved as viewed from above, yet the root-control barrier can follow right along it. Even at right-angle corners in a sidewalk, etc., the root-control barrier can follow the sidewalk—with no interruption in the barrier—by making a sharp corner as described under the following subheading.

Apparatus and Method Relative to Combinations Including Closed-Loop Root-Control Panels In the following disclosure it is assumed that there is only one panel P on each side of each polygon. However, it is to be understood that in any case there may be two, three or more panels on a side, with the panels on each side typically being coplanar relative to each other.

Figure 7:
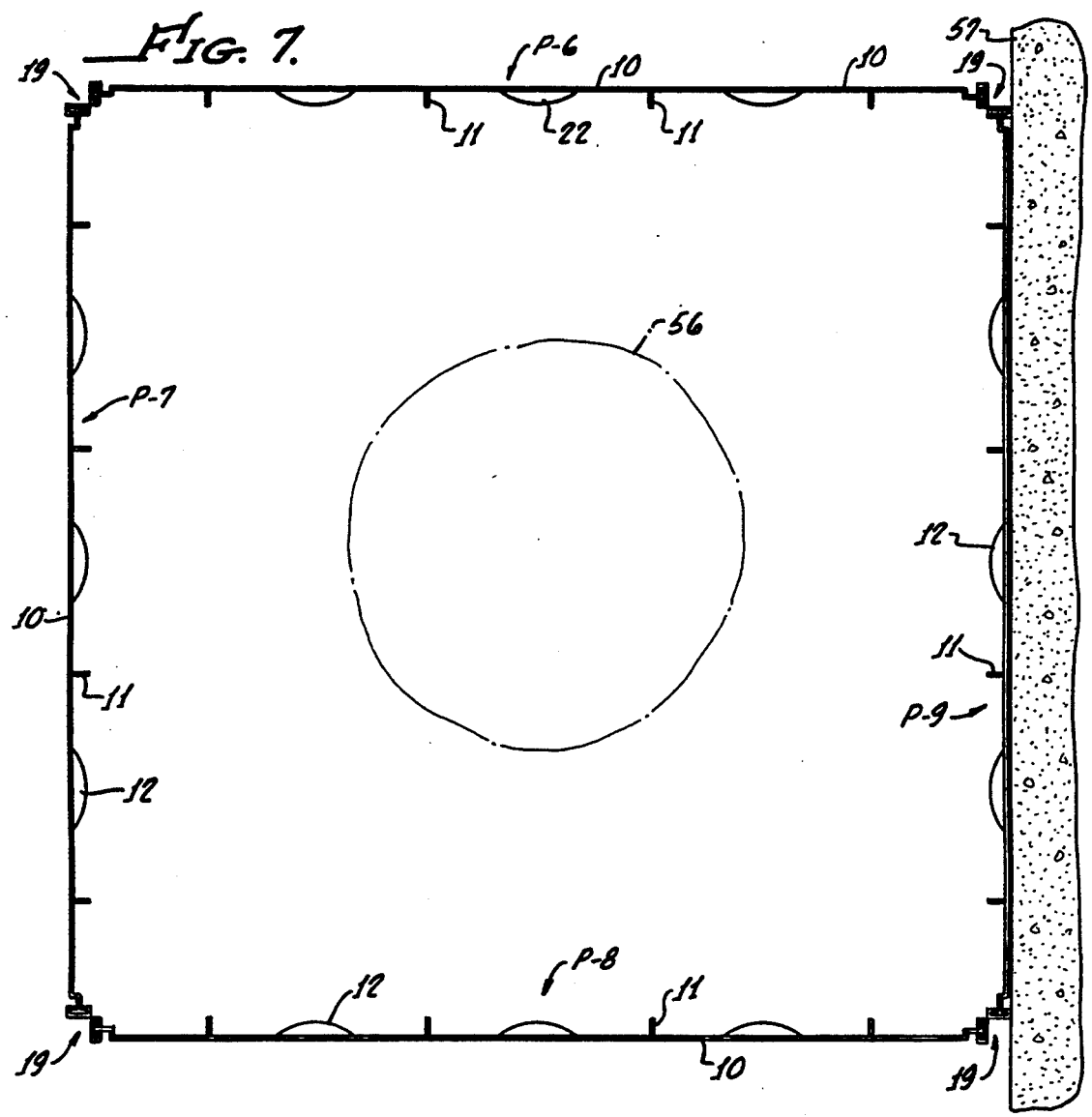
FIG. 7 is a plan view showing four control barriers in closed-loop square configuration, and also schematically showing a tree and sidewalk.
Figure 8:
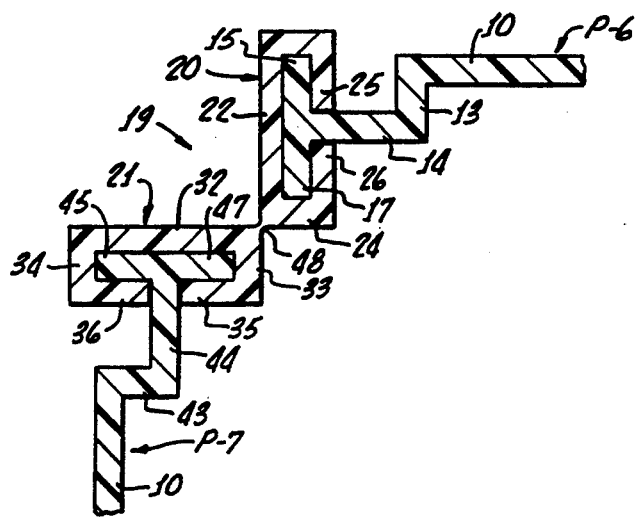
FIG. 8 is an enlarged horizontal sectional view of the upper-left corner in FIG. 7.

Referring to FIGS. 7 and 8, there is described a combination in which a small tree 56 is to be planted or transplanted in the earth with a root-control barrier around it in spaced relationship therefrom. It is to be understood that, in the best mode contemplated by the inventor, gravel is employed around the barrier as taught by the above-cited patent.

Let it be assumed that it is desired to plant the tree 56 in a hole having a generally square configuration as viewed from above, each side of the hole have a horizontal dimension of a little over two feet (in the present illustration).

Four panels, numbered P-6, P-7, P-8 and P-9, are removed from a bundle of panels by pulling one of the articulated joints 19. Panels P-6 and P-7 correspond to P-1 and P-2; they remain at all time connected as in their zigzag shipping configuration, but at (for example) a right angle (FIG. 7). Stated otherwise, the upper-left joint in FIG. 7 is the same as during shipping. The same is true of the lower-right joint in that figure, between P-8 and P-9. However, the intermediate articulated joint element 19 is not, when shipped, oriented and accordingly is pulled, turned about its vertical axis, and reconnected so as to have the orientation shown at the lower-left in FIG. 7. This joint is between panels P-7 and P-8.

The final joint, between panels P-9 and P-6, is made by inserting an articulated joint element 19 between panel P-9 and panel P-6 as illustrated in FIG. 7.

The result is that each of the four joints in the finished square root-control barrier is identical to each of the other four joints therein, all having their elements 48 on the inner (tree) side as shown in FIG. 8, and FIG. 7.

The tree 56 is then centered within the enclosure formed by the four panels and is planted by means of backfill earth, gravel, etc., as taught by the cited patent.

The backfilling is so conducted as to provide support for the panels P-6 through P-9 so that they do not bend unduly under the weight of earth. The earth on the outside and inside of the enclosure formed by the panels P-6 through P-9 cooperates with the inherent structural strength of the panels to keep the panels relatively straight.

As the tree grows, the roots spread outwardly, engage the inner faces of sheets 10, then (typically) grow sidewardly into engagement with the ridges 11, and then grow downwardly to regions below the lower edges of the panels, following which the roots grow outwardly as desired to strengthen the tree 56 but at a sufficient depth to prevent damage to a sidewalk or other static structure disposed adjacent the planting site. In FIG. 7, the sidewalk is shown at 57, but it is pointed out that the sidewalk is usually spaced away from the panels.

Figure 9:
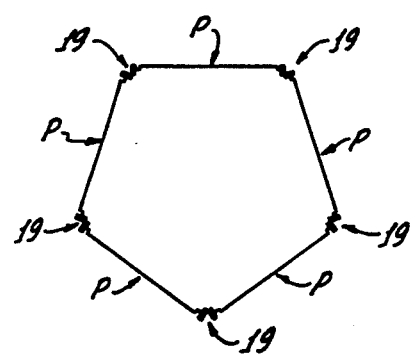
FIG. 9 corresponds to FIG. 7 but shows five panels connected in a closed-loop pentagon.

Referring to FIG. 9, the same operation is performed relative to a polygonal structure having more (or less) than four sides. The illustrated structure is a pentagon.

Additional Discussion and Disclosure

It is emphasized that, relative to both the single-elongate (FIG. 5) and closed-loop (FIGS. 7 and 9) configurations, the barrier may be stretched out into a straight, open-zigzag, or other desired shape. Relative to FIGS. 8 and 9, this could be done after breaking one of the joints.

In both instances, the ridges 11 and ground locks 12 would all be the inner side of the barrier, as desired. However, although these configurations would look substantially the same, they would not be the same. In the case of a straightened-out version of the four-sided barrier of FIG. 7, all of the thin flexible corner regions 18 are on the same side of the barrier—this being the inner side (on which the ridges 11 and ledges or ground locks 12 are located). Relative to the stretched-out form of the single-elongate barrier, in the above-described preferred form as the barrier came from the factory, alternate articulated joint elements 19 have their thin flexible portions 48 on alternate sides. The placing of the elements 18 on alternate sides is the preferred way of achieving the tightly-packed zigzag relationship described above.

It is to be understood that articulated joints may be employed in which the flexible joint members may bend more (or less) than 180 degrees, but these are not preferred.

The present panels P and joints 19 may also be oriented in circles and very smoothly-curving curves—both closed-loop and single-elongate. The single-elongate curves may be convex on concave (and the single-elongate may be singly or doubly curved). All that is necessary to do is take a zigzag bundle from the factory and reverse selected joints 19, leaving remaining joints alone. In every case, the joints reversed are selected so that the element 48 of each joint is on the convex side of such joint, so that webs 22 and 32 engage and keep the joint from breaking into an angle as distinguished from bending in a smooth curve. The ridges 11 are caused to be on the tree side of the barrier.

In the best mode contemplated by the inventor, the panels P are polyproylenes, namely "Copolymer" polypropylene, and are molded by Universal Plastic Molding of Baldwin Park, Calif. Also in the presently contemplated best mode, the articulated joint elements 19 are extrusions made of a thermoplastic elastomer, and are obtainable from Kirkhill Plastics of Brea, Calif.

The foregoing detailed description is to be clearly understood as given by way of illustration and example only, the spirit and scope of this invention being limited solely by the appended claims.

What is claimed is:

1. A method of protecting static structures from tree roots, which comprises:
   (a) providing a multiplicity of tree root control-barrier panels, (b) providing a multiplicity of flexible synthetic resin joints for pivotally connecting said panels to each other in a manner such that tree roots may not grow therebetween, (c) removably mounting one of said joints in connected relationship between each two adjacent panels to pivotally connect the same to each other, (d) accordion-folding a multiplicity of said connected panels together, with each panel except the two end panels being connected to two adjacent panels by said joints, (e) transporting said multiplicity of said accordion-folded panels to a job site, in the accordion-folded relationship resulting from said accordion-folding, (f) removing one of said joints to thereby disconnect a predetermined desired number of connected panels, at said job site, from the remainder thereof, (g) forming said last-mentioned connected panels into a configuration adapted to prevent tree roots from damaging a static structure, and (h) embedding said last-mentioned connected panels in the ground between a tree and a static structure at said site, said embedded panels preventing roots from said tree from damaging said static structure.

2. The invention as claimed in claim 1, in which said method further comprises forming said last-mentioned connected panels into a closed-loop polygon having said tree encompassed thereby.

3. The invention as claimed in claim 2, in which said joints are identical, and said method further includes reversing alternate ones of said joints when connecting said joints to said panels.

4. The invention as claimed in claim 1, in which said method further comprises forming said last-mentioned panels, resulting from said removal of one of said joints, into single-elongate configuration.

5. The invention as claimed in claim 1, in which said method further comprises employing elongate synthetic resin extrusions, including living hinges, as said joints.

6. The invention as claimed in claim 1, in which said method further comprises effecting said mounting and removal of said joints by sliding them transversely of said panels.

7. A system of root-control panels and hinges therebetween, comprising:

(a) a multiplicity of substantially identical synthetic-resin rectangular root-control panels, (b) a multiplicity of substantially identical synthetic-resin hinges each having two parts connected together by a soft off-center "living hinge" portion, and said parts being adapted to slide over the ends of said panels to pivotally connect adjacent panels together, said parts being adapted to slide off said panel ends so as to disconnect said panels from each other, and so as to change the location of said "living hinge" portion, (c) characterized in that each of said parts of each of said hinges, and each of said "living-hinge" portions, is so constructed that each two adjacent ones of said panels can be pivoted between, and only between, the following positions:

(1) a first position in which the adjacent panels are co-planar or along the same continuous curve, and (2) a second position at which each two adjacent panels are accordion-fold related to each other, and (3) positions in between said first and second positions on only one side of the assembly, and (d) further characterized in that said parts and "living hinge" portions are also so constructed that said pivoting can be in only one direction away from said first position, whereby depending upon which side of the assembly said "living hinge" portion is on, said pivoting is only on said one side or on the other side of the assembly.

* * * * *